April 16, 1929.  J. W. WOODWARD  1,709,646
CONTROLLING MECHANISM FOR COTTON WORKING MACHINES
Filed Nov. 16, 1923
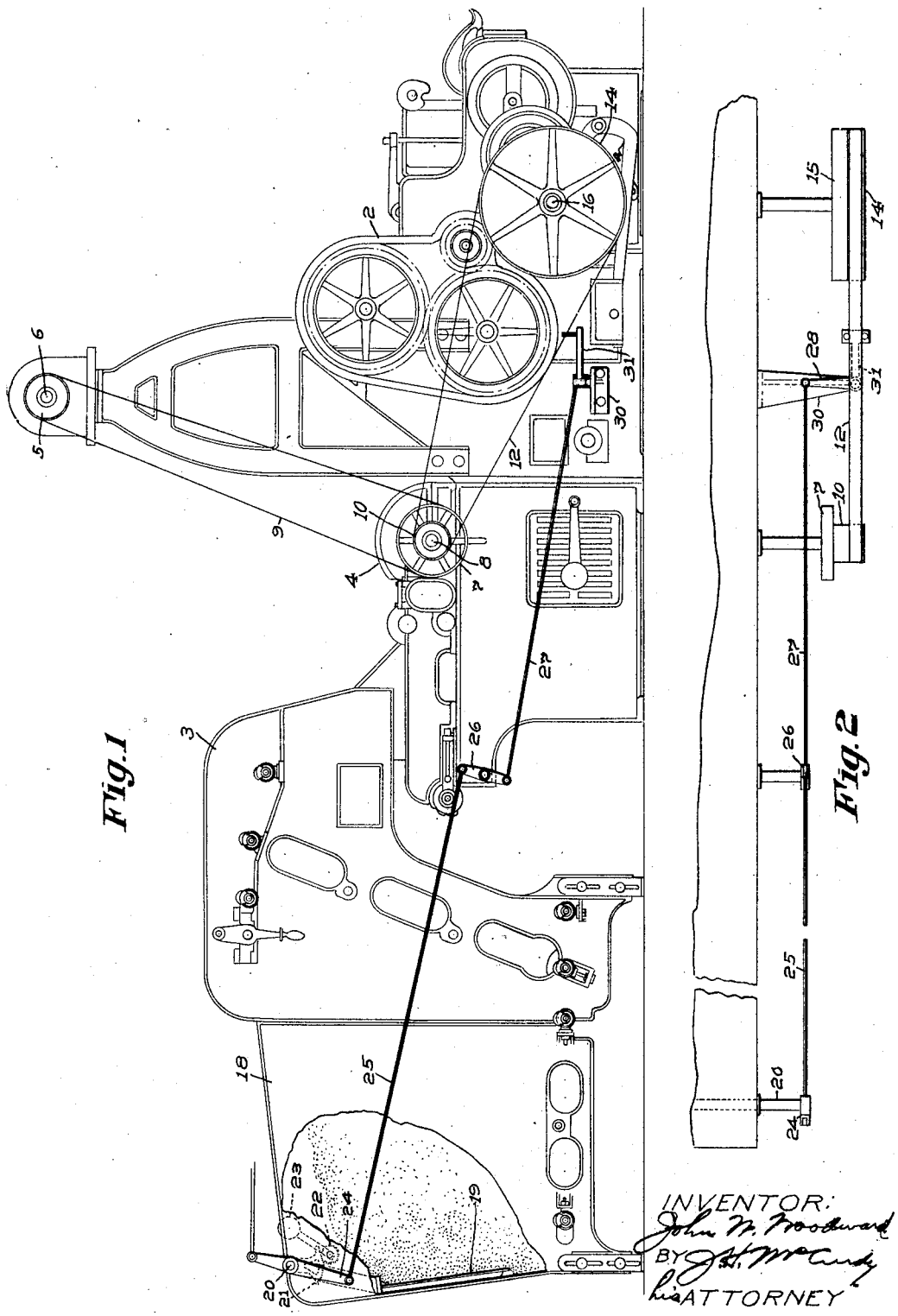
INVENTOR:
John W. Woodward
BY J. H. McCurdy
his ATTORNEY Patented Apr. 16, 1929.

1,709,646

UNITED STATES PATENT OFFICE.

JOHN WILLIAM WOODWARD, OF LAWRENCE, MASSACHUSETTS, ASSIGNOR, BY MESNE ASSIGNMENTS, TO SACO-LOWELL SHOPS.

CONTROLLING MECHANISM FOR COTTON-WORKING MACHINES.

Application filed November 16, 1923. Serial No. 675,140.

This invention relates to machines used in the textile industry for working cotton, and will be herein disclosed as embodied in a machine known commercially as a "breaker lapper."

In cotton mills as usually organized, the storehouse in which the bales of cotton are opened is located at some distance from the picker room, and the loose mass of cotton is transferred from the opening room to the picker room by a pneumatic conveyor. This conveyor usually delivers the cotton to a conveying belt which runs through the picker room and supplies cotton to a line of openers or breaker lappers. The distribution of the cotton by the belt to the individual machines in the line is usually controlled automatically by a mechanism commonly referred to as the Morton distributor and which is now well known in the trade. The arrangement is such, however, that the last one or two machines in the line are likely to be "starved" or fed insufficiently and irregularly. When a breaker lapper is fed in this manner it produces a lap of irregular thickness, the part of the lap made while an insufficient quantity of cotton is supplied being abnormally thin. This thin lap introduces variations in the character of the work turned out by subsequent machines and is objectionable for this reason.

It is the chief object of the present invention to overcome the difficulty just described. The invention is directed particularly to the provision of a mechanism which will automatically control the operation of a breaker lapper or like machine in response to predetermined variations in the supply of cotton thereto so that a lap of substantially uniform thickness will be produced. While the mechanism provided by this invention is of particular utility in a breaker lapper, it is contemplated that it may also be used to advantage in other machines where similar problems exist.

The nature of the invention will be readily understood from the following description when read in connection with the accompanying drawings, and the novel features will be particularly pointed out in the appended claims.

In the drawings,

Figure 1 is a side elevation of a combined breaker lapper and feeder equipped with a controlling mechanism embodying the present invention; and Fig. 2 is a plan view of a part of the controlling mechanism.

The apparatus shown comprises a breaker lapper, indicated in general at 2, and a feeder 3 and beater 4 for automatically feeding cotton to the lapper. These elements are of the usual commercial construction. The driving mechanism for the machine includes a pulley 5 on the counter shaft or motor shaft 6, and another pulley 7 on the beater shaft 8, these pulleys being connected by a belt 9. Another pulley 10 on the shaft 8 drives a belt 12 which, in turn, drives either a fast pulley 14 or a loose pulley 15 on the main driving shaft 16 of the lapper.

The cotton feeding mechanism includes a hopper 18 to which cotton is delivered automatically by the usual cotton distributing mechanism above referred to. Mounted within the hopper 18 is a feeler fork or rake 19 secured fast on a rock shaft 20 that is journaled in the upper part of the hopper. A toothed sector 21 is secured to this rock shaft and meshes with a gear 22 which carries a weighted arm 23. These parts thus act on the feeler to press it inwardly against the cotton in the hopper.

So long as an adequate supply of cotton is maintained in the hopper, the feeler will be pressed back by the cotton against the side of the hopper, as shown in Fig. 1; but when this supply becomes depleted, the feeler will be moved inwardly by the weight of the arm 23, and this movement will be transmitted through connections with a belt shipper acting on the belt 12 to shift this belt from the fast pulley 14 on to the loose pulley 15 and thus to stop the lapper.

These connections include an arm 24 fast on the rock shaft 20, a rod 25 which connects this arm with a lever 26, and another rod 27 connecting said lever with one arm 28 of a bell crank lever which is mounted on a bracket 30. The other arm 31 of this lever carries pins which straddle the belt 12. Transmission of motion from the feeler 19 to the belt shipper 31 will be readily understood from an inspection of the drawings.

The driving mechanism for the various elements of the lapper and the feeding mechanism therefor is such that when the belt 12 is shifted on to the loose pulley 15 all of the moving parts of both the lapper and the feeding mechanism are stopped, with the exception of the beater and the condenser fan. These parts are relatively heavy so that there is an advantage in keeping them in operation, and the fact that they are running while the machine otherwise is stopped, does not affect the lap that will be produced.

When the delivery of cotton to the hopper 18 is resumed, the accumulation of cotton in the hopper forces the feeler 19 back into its normal position, as shown in Fig. 1, and this movement is transmitted through the connections above described to the belt shipper 31, causing it to shift the belt 12 back on to the fast pulley 14 again. The machine thereupon resumes its normal operation.

It will now be evident that the mechanism provided by this invention stops the lap building mechanism, feed rolls, feed aprons, and the like, before the supply of cotton becomes so far depleted that there is danger of making a thin lap, and it starts these parts into operation again only after the delivery of cotton to the machine has been resumed. Any possibility of making a thin lap thus is avoided. The mechanism is entirely automatic in its action, and it is so simple in construction that there is practically no danger of its getting out of order.

While I have herein shown and described the best embodiment of my invention that I have so far devised, it will be evident that the invention may be embodied in other forms without departing from the spirit or scope thereof.

Having thus described my invention, what I desire to claim as new is:

1. In a machine of the character described, the combination of cotton working mechanism, means for feeding a loose mass of cotton to said mechanism, and means for automatically stopping said mechanism when the supply of cotton in said feeding mechanism becomes substantially depleted, said means being arranged to be actuated by said mass of cotton to automatically start the mechanism again when said supply has been replenished.

2. In a machine of the character described, the combination of cotton working mechanism, means for supplying cotton to said mechanism, a feeler controlled as to position by said supply, and starting and stopping means for said mechanism under the control of said feeler.

3. In a machine of the character described, the combination of mechanism for working cotton into the form of a lap, means for feeding a loose mass of cotton to said mechanism, and means for automatically stopping said mechanism when the supply of cotton thereto becomes depleted, said means being actuated by said mass of cotton for automatically starting the mechanism again when said supply has been replenished.

4. In a machine of the character described, the combination of mechanism for working cotton into the form of a lap, means for feeding a loose mass of cotton to said mechanism, and means for automatically stopping said mechanism when the supply of cotton thereto becomes depleted, said means being arranged to be actuated by said mass of cotton to automatically start the mechanism again when said supply has been replenished.

5. In a machine of the character described, the combination of a breaker lapper, feeding mechanism for supplying cotton to said lapper, a feeler for engaging the cotton in the feeder, driving mechanism for said lapper, and connections between said mechanism and said feeler whereby said feeler is enabled to stop the lapper when the supply of cotton in the feeder becomes depleted and to start the lapper again when said supply has been replenished.

6. In a machine of the character described, the combination of a breaker lapper, feeding mechanism for supplying cotton to said lapper including a hopper, a feeler mounted in said hopper, means for acting on said feeler to press it against the cotton in the hopper, driving mechanism for said lapper including a belt and fast and loose pulleys arranged to be engaged by said belt, a shipper for said belt, and connections between said feeler and shipper whereby the feeler operates through the shipper to move the belt on to the loose pulley when the supply of cotton in the hopper becomes depleted and to return the belt to the fast pulley again when said supply has been replenished.

JOHN WILLIAM WOODWARD.